United States Patent
Dirks et al.

(10) Patent No.: US 8,647,047 B2
(45) Date of Patent: Feb. 11, 2014

(54) METHOD AND SYSTEM FOR CONTROLLING A TURBOCOMPRESSOR GROUP

(75) Inventors: Jürgen Dirks, Bochum (DE); Peter Jansen, Oberhausen (DE)

(73) Assignee: MAN Diesel & Turbo SE, Augsburg (DE)

( * ) Notice: Subject to any disclaimer, the term of this patent is extended or adjusted under 35 U.S.C. 154(b) by 1054 days.

(21) Appl. No.: 12/684,236

(22) Filed: Jan. 8, 2010

(65) Prior Publication Data

US 2010/0178154 A1 Jul. 15, 2010

(30) Foreign Application Priority Data

Jan. 12, 2009 (DE) .......................... 10 2009 004 376

(51) Int. Cl.
*F04D 27/02* (2006.01)
(52) U.S. Cl.
USPC ...................... 415/1; 415/26; 415/47; 415/50
(58) Field of Classification Search
USPC .................... 415/1, 13, 17, 26, 27, 47, 49, 50
See application file for complete search history.

(56) References Cited

U.S. PATENT DOCUMENTS

| | | | |
|---|---|---|---|
| 4,640,665 A | 2/1987 | Staroselsky et al. | |
| 5,108,263 A * | 4/1992 | Blotenberg | 417/2 |
| 5,347,467 A | 9/1994 | Staroselsky | |
| 5,743,714 A | 4/1998 | Drob | |
| 6,164,901 A * | 12/2000 | Blotenberg | 415/1 |
| 6,233,954 B1 | 5/2001 | Mchaffey et al. | |
| 6,602,057 B2 | 8/2003 | Saxena et al. | |

* cited by examiner

*Primary Examiner* — Edward Look
*Assistant Examiner* — Jason Davis
(74) *Attorney, Agent, or Firm* — Cozen O'Connor

(57) ABSTRACT

A method for controlling at least two turbocompressors (1.1, 2.1), each having a control device (1.2, 2.2) for maintaining a distance relative to a surge limit curve (P1, P2) of the respective turbocompressor; wherein a first distance (A1.1, A2.1) is determined for each turbocompressor from its surge limit curve; wherein the distance to be maintained can be trimmed relative to this first distance in the control devices; and wherein the distance (A2.2) of a control device (2.2) to be maintained is trimmed relative to its first distance (A2.1) based on a trimming (A1.1→A1.2) of another control device (1.2) in such a way that a total process variable (dV/dt) remains substantially constant.

7 Claims, 1 Drawing Sheet

METHOD AND SYSTEM FOR CONTROLLING A TURBOCOMPRESSOR GROUP

BACKGROUND OF THE INVENTION

1. Field of the Invention

The present invention is directed to a method of controlling two or more turbocompressors each having a control device for maintaining a distance of an operating point relative to the surge limit curve of the respective turbocompressor and to a system and a computer readable medium for implementing said method.

2. Description of the Related Art

The performance map of a turbocompressor is divided by the surge limit curve into a stable region and an unstable region. Surging occurs when the operating point of the turbocompressor enters the unstable region of the performance map due to a reduction in the flow rate or an increase in the pressure ratio. This results in cyclical delivery and backflow of the compressed medium, often accompanied by high vibrations, pressure surges, and a rapid rise in temperature in the turbocompressor. Possible consequences are, for example, bearing damage, rubbing damage, and damage to the impeller or impeller vanes, which could lead to operating failure.

In order to prevent this, control devices are known for maintaining a fixed or predefinable distance of the operating point from the surge limit curve and controlling the operating point of the turbocompressor, for example, correspondingly changing its speed or opening a relief valve. Hereinafter, regulation, i.e., a control based on fed-back actual values and comparison thereof with reference values, will also be referred to as control.

If a plurality of turbocompressors are connected together in such a way that they jointly convey a medium, a control device is generally provided for each compressor to maintain its distance from the surge limit curve because prevention of surging should be of primary importance.

Without any coordination of these control devices, an uneven load sharing may come about between the individual turbocompressors, and the entire system can become unstable due to control devices acting counter to one another.

Therefore, it is known to provide a load sharing control by means of which the operating points of the individual turbocompressors are selected in such a way that all of the compressors have substantially the same distance from their respective surge limit curve. This load sharing control works without central or master controllers and is based on intercommunicating control devices of the individual compressors.

In contrast, U.S. Pat. No. 6,602,057 B2 discloses a central control which carries out the load sharing based on flow capacity coefficients of the individual compressors. For load sharing of interconnected compressors, U.S. Pat. No. 5,743,714 discloses minimizing the total work. In U.S. Pat. No. 6,233,954 B1, a high-ranking compressor is selected and the operating points of the individual compressors are then set depending on this high-ranking compressor. These concepts do not take into account the distance from the surge limit curve in load sharing.

In the above-mentioned load sharing control, a manual trimming or adjustment of the individual control devices is provided, by means of which the distance to be maintained from the surge limit curve can be changed relative to a distance that is substantially identical for all of the compressors. By trimming is meant herein a displacement of that distance of an operating point from the surge limit curve that is sought to be maintained preferably by a control device in a turbocompressor. Accordingly, trimming of this kind can shift the operating points of the individual turbocompressors, i.e., the load sharing control can be manually overdriven to a certain extent, for example, to deliberately load or unload individual compressors to different degrees or to operate them closer to or farther away from their surge limit.

However, while the known load sharing control selects substantially the same distance from the respective surge limit curve for all of the turbocompressors in such a way that the interconnected compressors, as a totality, present the desired total process variables, for example, a total flow capacity and a total pressure ratio, manual trimming of individual control devices without taking into account the rest of the turbocompressors leads to an unwanted change in these total process variables. For example, if the distance from the surge limit of only one compressor of a group of two turbocompressors is reduced, this leads to a reduction in its flow capacity with the pressure ratio remaining the same and, therefore, also to an unwanted reduction in the total flow capacity of the group.

In order to maintain a total process variable, U.S. Pat. No. 5,347,467 proposes a central controller which jointly adjusts local anti-surge controllers. Specific trimming of individual control devices is not provided.

SUMMARY OF THE INVENTION

It is therefore an object of the present invention to improve the above-mentioned load sharing control devices.

This object is met by providing a method for controlling at least two turbocompressors, each having a control device for maintaining a distance of an operating point relative to a surge limit curve of the respective turbocompressor, wherein a first distance is determined for each turbocompressor from its surge limit curve, and wherein the distance to be maintained can be trimmed relative to this first distance in the control devices characterized in that the distance of a control device to be maintained is trimmed relative to its first distance based on a trimming of another control device in such a way that a total process variable remains substantially constant. A system for implementing said method and a computer program product or storage medium with corresponding program code are also provided.

Two or more turbocompressors can be combined to form a group to realize a total process variable. For example, two or more turbocompressor chains can be connected in parallel and can jointly adjust a total pressure ratio between suction pressure and final pressure and a total flow capacity. On the other hand, two or more turbocompressor chains can be connected in series in one or more of these turbocompressor chains.

At least two of these turbocompressors have, respectively, a control device for maintaining a preferably predefinable distance from the surge limit curve of the respective turbocompressor. For example, these control devices can change the speed of the respective turbocompressor and/or open a relief valve.

A first distance from the surge limit curves can be determined for these turbocompressors. This first distance can preferably be of substantially identical magnitude for all of the control devices in order to optimize the output distribution among the interconnected compressors.

The distance to be maintained can be trimmed in the control devices relative to this first distance. In other words, the control device can be influenced in such a way that it tends to maintain the trimmed distance instead of the first distance. A load sharing control of this kind with trimmable control devices is already known.

According to the present invention, it is now provided that the distance to be maintained by at least one control device is trimmed relative to its first distance based on the trimming of the other control devices in such a way that a total process variable remains substantially constant. Accordingly, by taking into account the trimming of the other control devices, an unwanted and disadvantageous change in a total process variable, for example, a total flow rate, a total flow capacity, a total suction pressure and/or a total final pressure and/or a total pressure ratio, can be prevented by the trimming of a control device.

If three or more turbocompressors are connected together, for example, three compressors operating in parallel or two compressors connected in series which, as a totality, operate in parallel with a third compressor, a group of this kind has more degrees of freedom. Therefore, one or more control devices can be trimmed. Further, if the rest of the control devices are trimmed according to the invention based on the trimming of the trimmed control devices, an unwanted change in a total process variable can be prevented.

In this case, it is particularly advantageous that the control devices communicate their trimming to one another so that the distance to be maintained by a control device is trimmed relative to its first distance based on the trimming communicated by the other control devices. The trimming can take place iteratively, for example, in that a trimming of a first control device is initially specified or predetermined and then communicated by this first control device to the other control devices. These other control devices are trimmed in turn to compensate the trimming of the first control device. The trimming of the other control devices are communicated to the first control device. Since the trimming of the other control devices compensates precisely the originally specified trimming of a first control device, no further trimming is carried out in the first control device. Similarly, the trimming of all of the control devices can also be determined jointly.

In a preferred embodiment, particularly in case not all of the specified trimming can be realized simultaneously without changing the total process variable, the distances to be maintained in the control devices are trimmed relative to their first distance based on the trimming of the other control devices in such a way that, first, the total process variable remains substantially constant and, second, the ratio of the difference between the trimming of the individual control devices between one another or relative to one another substantially corresponds to the ratio of the specified trimming.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Other advantages and features will become apparent from the following description and the drawings in which.

DETAILED DESCRIPTION OF THE PRESENTLY PREFERRED EMBODIMENTS

Figure 1:
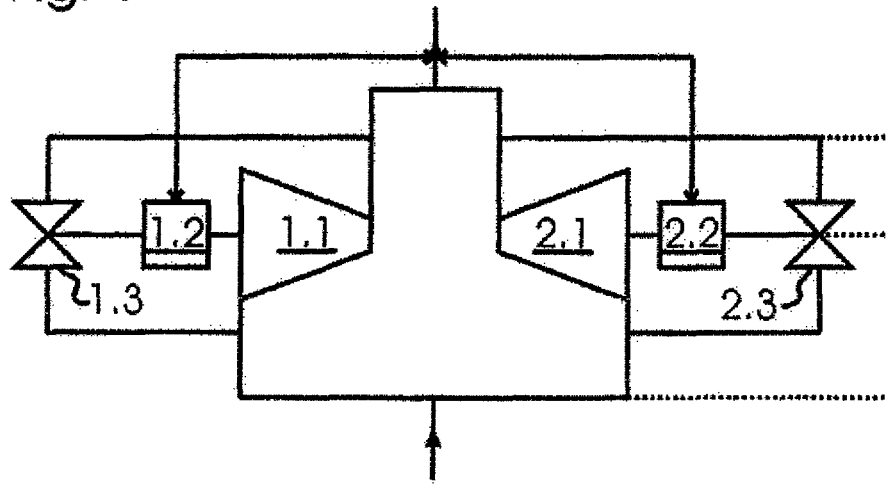
FIG. 1 shows a group of two interconnected turbocompressors with a system for control thereof according to an embodiment of the present invention.

FIG. 1 shows a group of two turbocompressors 1.1, 2.1 which are connected in parallel. Every turbocompressor has a control device 1.2 and 2.2 for maintaining a distance from a surge limit curve P1 and P2, respectively, (FIG. 2) which, for example, changes a speed of a respective compressor and/or opens a relief valve 1.3 and 2.3, respectively, to maintain this distance. As is indicated by the double-arrow in FIG. 1, the two control devices 1.2, 2.2 communicate with one another and convey, particularly mutually, the distances to be maintained by them from the surge limit curve.

Figure 2:
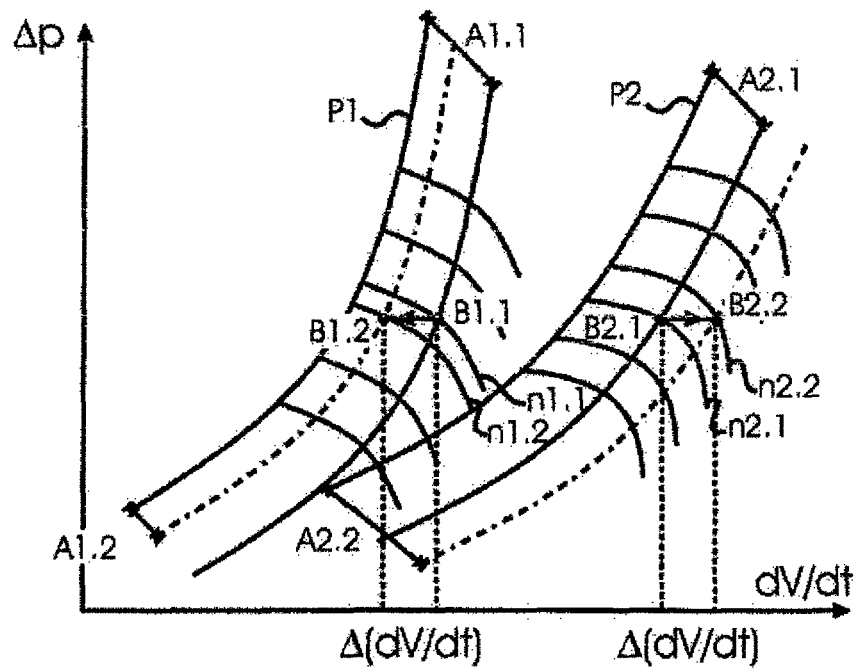
FIG. 2 shows the performance maps of the two turbocompressors in FIG. 1.

A method according to an embodiment of the present invention for controlling this group is described more fully with reference to FIG. 2.

FIG. 2 shows the performance maps of the two turbocompressors 1.1, 2.1 in the form of a pressure ratio $\Delta p$ over the flow capacity $dV/dt$. For this purpose, the surge limit curves P1 and P2, respectively, and some lines of constant speed n1.1, n1.2 and n2.1, n2.2, respectively, are shown for the two compressors.

First, the same first distance A1.1=A2.1 from the respective surge limit curve P1 and P2, respectively, is determined for both turbocompressors for a desired total flow capacity $dV/dt$ and total pressure ratio $\Delta p$ of a load sharing control. FIG. 2 shows the distance from the two surge limit curves P1, P2 corresponding to solid curves on which the operating points B1.1 and B2.1 of the two turbocompressors lie when the control devices are not trimmed.

In the first control device 1.2, the distance to be maintained is trimmed manually relative to the first distance A1.1 in that the user specifies a smaller distance A1.2 to be maintained. Accordingly, the operating point of the first turbocompressor 1.1 also shifts to B1.2 and its flow capacity is reduced by $\Delta(dV/dt)$.

The first control device 1.2 communicates the trimming A1.1→A1.2 to the second control device 2.2. The latter trims the distance A2.2 to be maintained relative to its first distance A2.1 based on this trimming A1.1→A1.2 in such a way that the total flow capacity $dV/dt$ remains substantially constant.

The invention is not limited by the embodiments described above which are presented as examples only but can be modified in various ways within the scope of protection defined by the appended patent claims.

We claim:

1. A method for controlling at least two turbocompressors (1.1, 2.1), each having a control device (1.2, 2.2) for maintaining a distance of an operating point (B1.1, B2.1) relative to a surge limit curve (P1, P2) of the respective turbocompressor, said method comprising:

(a) determining a first distance (A1.1, A2.1) of an operating point for each turbocompressor from its respective surge limit curve (P1, P2);

(b) trimming the first distance of the operating point (B1.1) of a first turbocompressor to arrive at a desired distance (A1.2) of an operating point (B1.2) relative to the surge limit curve; and (c) trimming the first distance of the operating point (B2.1) of at least a second turbocompressor based on the trimming of the first turbocompressor so that a total process variable remains substantially constant, wherein step (a) is performed so that the first distance is substantially identical for all turbocompressors.

2. The method according to claim 1, wherein the total process variable comprises one or more of a total flow rate, a total flow capacity (dV/dt), a total suction pressure, a total final pressure and a total pressure ratio (Δp).

3. The method according to claim 1, comprising controlling three or more turbocompressors; and wherein the desired distance of an operating point to the respective surge limit curve is trimmed relative to the first distance based on the trimming of the remaining turbocompressors in such a way that a total process variable remains substantially constant.

4. The method according to claim 1, wherein the desired distances are trimmed relative to their respective first distance based on the trimming of the other turbocompressors.

5. The method of claim 1, additionally comprising the step of communicating the respective trimming distance between the at least two turbocompressors; and trimming the desired distance of an operating point of a turbocompressor to its surge limit curve relative to its first distance based on said communicated trimming.

6. A system for controlling at least two turbocompressors (1.1, 2.1) comprising control devices (1.2, 2.2) for maintaining distances from the surge limit curves of the respective turbocompressors; and wherein said control devices are configured for implementing the method according to claim 1.

7. A non-transitory computer readable medium comprising a program code for carrying out the method according to claim 1.

* * * * *